(12) United States Patent
Shigyo

(10) Patent No.: US 6,597,292 B1
(45) Date of Patent: Jul. 22, 2003

(54) WIRELESS TRANSMISSION APPARATUS AND CONTROL SYSTEM

(75) Inventor: Masahiro Shigyo, Fukuoka-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/407,374

(22) Filed: Sep. 28, 1999

(30) Foreign Application Priority Data

Oct. 8, 1998 (JP) .......................................... 10-286235

(51) Int. Cl.7 .......................... G08C 19/00; G05B 19/00
(52) U.S. Cl. ............................ 340/825.69; 340/825.72; 340/5.61; 341/176
(58) Field of Search ....................... 340/825.69, 825.72, 340/5.1, 5.61, 426, 425.5, 10.52

(56) References Cited

U.S. PATENT DOCUMENTS

| | | | | |
|---|---|---|---|---|
| 5,933,090 A | * | 8/1999 | Christenson | 340/825.69 |
| 5,937,065 A | * | 8/1999 | Simon et al. | 380/9 |
| 6,034,617 A | * | 3/2000 | Luebke et al. | 340/825.31 |

FOREIGN PATENT DOCUMENTS

JP       9204252       8/1997

* cited by examiner

Primary Examiner—Donnie L. Crosland
(74) Attorney, Agent, or Firm—Stevens, Davis, Miller & Mosher, LPP

(57) ABSTRACT

A transmission apparatus for transmitting key operation information in a wireless signal form can avoid erroneous operation, even when a radio interference occurs between a transmission system and a reception system. A keyboard outputs a key make code when a key is depressed, and outputs a key break code when the key is released. Even when the keyboard is connected to a personal computer via a wireless signal, these key codes are transmitted utilizing the wireless signal. However, after the key make code is transmitted, if the key break code cannot be transmitted due to noise, then the personal computer cannot recognize that the relevant key is released. The transmission system (keyboard side) regularly transmits a fixed-term identification code (ID code) to the reception system (personal computer side). When the reception system cannot regularly detect the fixed-term identification code, the transmission system automatically transmits an all off code to the personal computer so as to notify that all keys are set under a break state. As a result, the transmission system can avoid the erroneous operation.

5 Claims, 5 Drawing Sheets

WIRELESS TRANSMISSION APPARATUS AND CONTROL SYSTEM

BACKGROUND OF THE INVENTION

1. Field of the Invention

The present invention is related to a wireless transmission apparatus and a control system thereof, for transmitting information, which is input from a keyboard and other input means, to a personal computer and the like in order to operate the personal computer and the like from a remote place by manipulating the keyboard and the like.

2. Description of the Related Art

In general, an infrared remote controller, a wireless keyboard and the like employed in a wireless transmission apparatus have two different control functions. That is, as the normal control function, they output a make code indicative of a key depressing state and a break code indicative of a key releasing state. As another control function, in a low electric field in which a transmitted electromagnetic wave cannot be reached to a reception side, or in radio interference caused by other wireless apparatuses, they continuously transmit an all break code when all of keys are turned OFF, in order to avoid erroneous operation of an external control apparatus (personal computer and the like) provided on the reception side.

In this wireless transmission apparatus, an external remote control appliance connected to the reception side is controlled based on a key information which is once made on the reception side. Subsequently, a break code which is information to release the key depressed on the transmission side is output to the reception side. The reception side realizes a remote control operation by depressing a plurality of keys in amultiple mode, or a repeat process operation by continuously depressing a certain one key, by holding the key make information as a result of the key depression from the transmission side.

Considering that the key break code cannot be received when the radio interference occurs, in the control system of this wireless transmission apparatus, information that all of the keys are continuously brought into the break state is continuously transmitted to the reception side when all of the keys are not depressed. A system arrangement is known which previously prevents the erroneous operation of the remote reception apparatus due to the inferior transmission of the key break code when the radio interference occurs, utilizing the continuous transmission of the all break code. That is, even if the radio interference happens to occur, when it disappears, all of the key break.process operations are executed on the reception side to release the key make holding.

JP-A-9-204252 discloses a wireless keyboard apparatus capable of preventing the erroneous operation when the radio interference and the like happens to occur. The keyboard control unit of this conventional wireless keyboard apparatus is equipped with the function capable of continuously transmitting the all off code automatically when all of the keys are turned OFF, in addition to the normal operation for outputting a key ON code and a key OFF code. When the radio interference and the like disappear, the all off code is received by a receiver. Upon receipt of the all off code, the receiver transmits to a computer the key OFF code which turns a key in the ON state registered in a status register off, and deletes the number of the key in the ON state.

In the above-described prior art, the all off code is continuously transmitted when all of the keys are not depressed. As a result, even if the key is held is erroneously held in the key make state due to the worst environment and so forth including the radio interference on the reception side, when all of the keys are released at the time of the disappearance of the worst environment, the key which has been brought into the key make state on the reception side due to the radio interference can be always released only when the all off code (all off break code) is delivered to the reception side.

However, in the control system of the above-explained conventional wireless transmission apparatus, all of the keys are released and the all break code transmission process operation is required on the transmission side. Furthermore, the key make state cannot be solved unless this all break code signal is delivered to the reception side when the radio interference is solved even instantaneously. Then, the reception side cannot receive the all break code under such a condition that the occurrence of the radio interference is continued for a long term. Thus, the erroneous operation will occur due to the remaining key make state.

SUMMARY OF THE INVENTION

The present invention has been made to solve the above-explained problems, and therefore, has an object to provide a wireless transmission apparatus and a control system thereof which can completely preventing an erroneous operation of a remote reception apparatus due to an inferior transmission of a key brake code when a radio interference happens to occur, as follows. That is, even when the radio interference is continued for a long time period, a reception side can firmly sense the radio interference, and produces an all break code in order to release a remaining key make state of the reception side.

To achieve the above-described object, such a system is constructed in accordance with the present invention. That is, a transmission side continuously transmits a data packet containing identification data (or confirmation data) specifically given to a transmitter thereof in a certain time interval in a burst mode, whereas a reception side monitors the identification data transmitted from the transmission side in a link channel. In other words, a wireless transmission apparatus according to the present invention comprises: a transmission system including key input means, a wireless communication unit for transmitting an input key data code, and a transmitting antenna; and a reception system including a receiving antenna, a wireless communication unit, and reception key code analyzing means for analyzing a key make state and a key break state; wherein the transmission system regularly transmits an identification code to the reception system; and when the identification code is not detected regularly, the reception system automatically produces an all off code for informing an external appliance that all of keys are brought into a break state.

As previously explained, in the wireless transmission apparatus, by intermittently receiving the identification code plural times in a certain channel, the reception side can confirm that the reception channel is stable as a communication channel. Conversely, under a weak electric field condition where the strength of the electromagnetic wave is low, or under a radio interference condition where the transmission channel of the transmission side is forcibly changed and a wireless interference happens to occur, the reception side cannot detect the intermittently transmitting identification code. When the non-detection time is continued longer than a pre-selected time duration (a predetermined time), the reception side judges that data cannot be received from the presently communicated channel to self-judge that the link channel is unstable, so that it does not transmit information on the channel to the external appliance until the reception of the identification data is returned. Also, when the radio interference is determined, the reception side transmits the all key break code to control the external appliance so as to get out from the key make state. Therefore, such a system can be realized which can detect the radio interference of the reception channel due to the continuous reception or continuous non-reception of the identification code.

Then, if the number of the continuous reception OK or the number of the continuous reception NG due to the reception of a fixed-term identification code (ID code) is counted by the reception side system, as the remote control data packet is transmitted from the transmission side to the reception side between the transmission of the present identification code and the transmission of the next identification code, the reception system can easily judge as to whether or not the present data is data received while the electromagnetic wave condition is stable.

Also, by the reception count control process of the identification code, it is possible to judge that there is data which is transmitted between the present reception data and the next reception data but is not received in the reception system. If this judgement system is applied to a wireless transmission apparatus, the all key break code at the time of the radio interference can be produced only in the receiver.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various embodiments of the present invention will be described in detail.

First Embodiment

Figure 1:
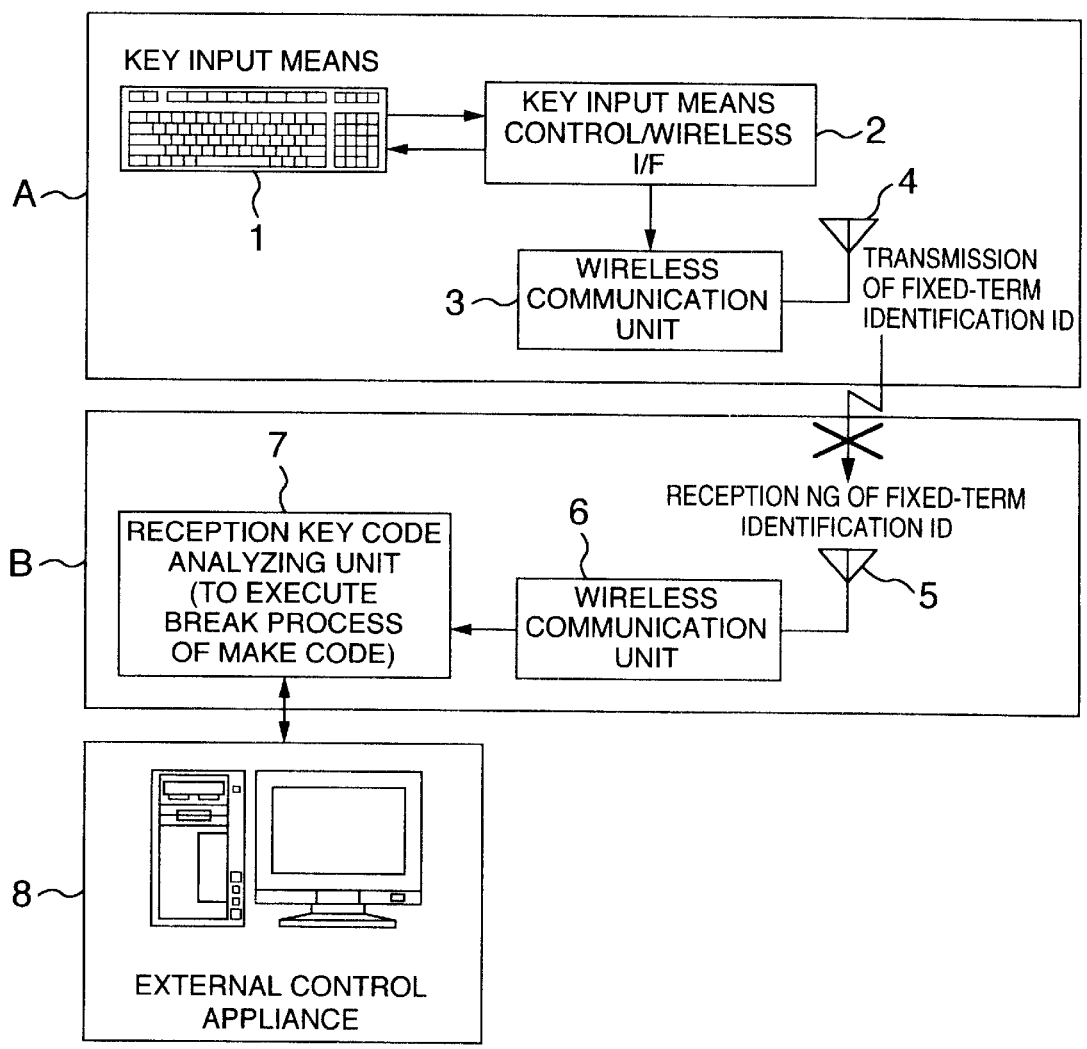
FIG. 1 is a schematic diagram for showing a production of an all break key code at the time of an electromagnetic wave (radio) interference in a wireless transmission apparatus according to the present invention.

FIG. 1 is a schematic diagram for showing a generation of an all break key code at the time of a radio interference in a wireless transmission apparatus according to a first embodiment of the present invention.

In FIG. 1, a transmission system "A" of the wireless transmission apparatus comprises key input means 1, a control unit 2, a wireless communication unit 3, and a transmitting antenna 4. The control unit 2 has a key input means control function and a wireless interface function. The wireless communication unit 3 modulates a wireless signal with an input key data code to transmit the modulated wireless signal. The transmission system "A" has a function as a wireless keyboard by comprising these functional units 1 to 4. The key input means control function of the control unit 2 implies that the input key information is input to the control unit 2 so as to produce a key transmission packet, and furthermore to produce a fixed-term identification data packet containing a fixed-term identification code every predetermined time. The wireless communication unit 3 modulates the wireless signal with each of the data packets produced by the control unit 2. It should be noted that the wireless communication unit 3 may be replaced by infrared communication means so as to realize the above-explained function.

In the transmission system "A" with employment of the above-described arrangement, an electric appliance installed on the reception side can be remote-controlled by operating the key input means 1. The key input means 1 acquires key depressing information and key releasing information made by a user, and then supplies these key information to the control unit 2 via a signal line . In the control unit 2, the key information is processed to produce a key transmission packet. The control unit 2 produces the fixed-term identification data packet containing the fixed-term identification code (ID code) and the transmission packet containing the key information every predetermined time to supply these packets to the wireless communication unit 3. The wireless communication unit 3 converts these packets into a wireless signal to transmit the wireless signal from the transmitting antenna 4. As explained above, the key information operated by the key input means 1 is transmitted in the form of the wireless signal from the transmission system. Also, the fixed-term identification code (ID code) is transmitted from the transmission system every predetermined time.

A reception system "B" shown in FIG. 1 comprises a receiving antenna 5, a wireless communication unit 6, and a reception key code analyzing unit (key make/key break processing unit) 7. Reference numeral 8 denotes an external control appliance.

In the reception system "B", the fixed-term data packet and the key information transmission packet both of which are transmitted from the transmission side are received in the receiving antenna 5, and then are demodulated in the wireless communication unit 6. The demodulated reception data is supplied to the reception key code analyzing unit 7. The reception key code analyzing unit 7 counts continuous reception times of the identification data and continuous non-reception times of the identification data at the time of the radio interference to extract key make information and key break information by analyzing key information. A key hold and a key release are reflected to the controls of the external control appliance 8 and the reception system "B" itself.

The reception system "B" judges as to whether or not the fixed-term identification code (ID code) transmitted from the transmission system "A" is received in a continuous manner. When the fixed-term identification code is not continuously received, continuous reception NG information is produced. The continuous reception NG information is processed in the key code analyzing unit 7 of the reception system "B". In accordance with the processed result, an all key break code is transmitted to the external control appliance 8. As explained above, if the fixed-term identification code is not continuously received, according to the judgment made by only the reception side, the reception side shows the external control appliance 8 (for example, personal computer) that the all key break code process operation is carried out.

Figure 2A:
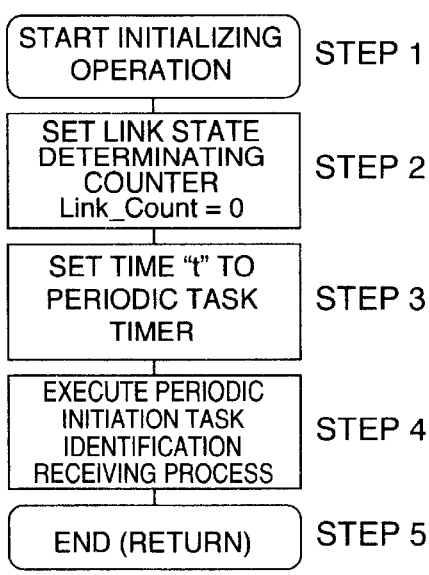
FIGS. 2A and 2B are flowcharts for showing the production of the all break key code in a fixed-term identification code receiving unit of the wireless transmission apparatus.
Figure 2B:
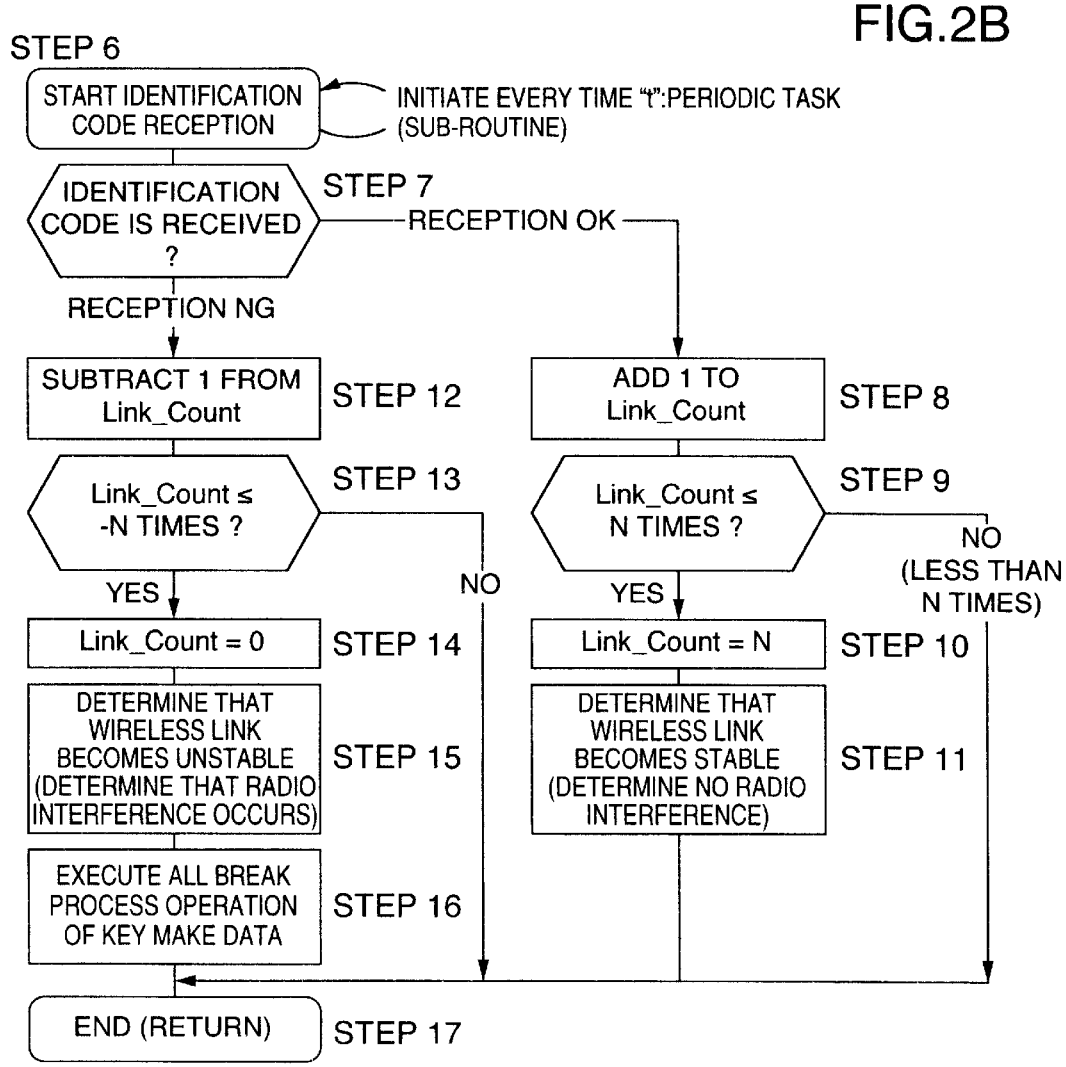

FIGS. 2A and 2B are flowcharts showing the production of the all break code in the reception system "B" of the wireless transmission apparatus. Now, the process contents which logically executes the control operations explained in FIG. 1 will be sequentially described step by step by using the flowcharts.

FIG. 2A shows a series of initializing process operation. As shown in FIG. 2A, a step 1 defines an initialization starting process operation of a flowchart for the identification ID receiving unit. A step 2 corresponds to a process block for initializing a link state determining counter. In this step, a count value of the link state determining counter is set to "0". A step 3 corresponds to a process block for setting a soft period task initiating timer. A step 4 corresponds to a process block for executing a periodic initialing task registering operation (identification reception process operation). A step 5 corresponds to an initialization ending process operation of the flowchart for the fixed-term identification code receiving unit. "t" indicates a repetition period of an identification code receiving process task.

These steps 1 to 5 are to execute the initializing operation so as to recognize the identification code by the receiving antenna 5, the wireless communication unit 6 and the reception key code analyzing unit 7 in the reception system "B" shown in FIG. 1. The initializing operation is carried out in such a way that a period task timer is set every time "t" in order that an identification code receiving time counter (Link-Count) can be initialized plural times at the step 2, and that an identification code receiving process task can be initiated every predetermined time at the steps 3 and 4.

FIG. 2B shows a series of process operations to receive the fixed-term identification code to diagnose whether or not there is the radio interference and to produce the all key break code. "N" indicates a set value of the link state determining counter. In FIG. 2B, a step 6 corresponds to an identification reception starting process operation in which a periodic task initiated every time "t" is started. In other words, the below-mentioned processes (defined from step 7 to step 16) are necessarily initiated every fixed-term time "t". A step 7 corresponds to an identification code receiving/ judging process block. When the identification code is received, this process operation is advanced to a step 8, whereas when the identification code is not received, the process operation is advanced to a step 12.

A step 8 corresponds to a process block for incrementing the link state determining counter, and a step 9 corresponds to a process block for judging whether or not the count value of the link state determining counter is larger than or equal to "N". When the count value of the link state determining counter is smaller than "N", the process operation is directly advanced to a step 17 at which the present task is accomplished. When the fixed-term identification code is continuously detected to continuously increment the link state determining counter so that the count value of the link state determining counter is greater than or equal to "N", the process operation is advanced to a step 10. The step 10 corresponds to a process step for executing a process operation of an increment limiter in order that the count value (Link-Count) of the link state determining counter does not exceed "N". A step 11 is a process block for determining that the wireless link is under stable condition (namely, determining no radio interference). In these steps 8 to 11, while the link state determining counter is incremented, the judgment whether or not the fixed-term identification code can be continuously received N times is made. When the fixed-term identification code can be received more than N times, the definition that no radio interference occurs is made at the step 11.

A step 12 is such a process block for decrementing the link state determining counter. A step 13 corresponds to a process operation for judging whether or not the count value of the link state determining counter is smaller than or equal to "−N". When the count value of the link state determining counter is larger than "−N", the process operation is directly advanced to the step 17 at which the task executed at this time is ended. In the case that the count value of the link state determining counter is continuously decremented without detecting the fixed-term identification code in the continuous manner, and then the count value of the link state determining counter becomes smaller than or equal to "−N", the process operation is advanced to a step 14.

The step 14 corresponds to a process block for setting the count value of the link state determining counter to "0" (channel hold time set). A step 15 corresponds to a process block for determining that the wireless link is unstable (namely, determination of existence of radio interference). When it is determined by the steps 12 to 15 that the radio interference occurs, the process operation is advanced to a step 16. The step 16 corresponds to a process block for executing an all break process operation of key make data.

As previously explained, while decrementing the link state determining counter (Link-Count) at the step 12, it is judged at the step 13 that the fixed-term identification code is not received continuously plural times. When the wireless link becomes unstable because the radio interference and the like occur, the all key break code can be firmly and finally transmitted (step 16) by the reception system "B" itself, and then the all key break code can be transmitted to the external control appliance 8 (for example, personal computer).

The count value (Link-Count) of the link state determining counter does not exceed "N" at the step 10, and the count value (Link-Count) of the link state determining counter is forcibly set to "0" at the step 14 when it becomes smaller than equal to "−N" at the step 13. This is because the below-mentioned hysteresis control is carried out. The hysteresis control implies the following control. That is, when it is once determined that no radio interference occurs, if another determination is made that the fixed-term identification code is not continuously received 2×N times in the continuous manner, then it is judged that the radio interference occurs. To the contrary, when it is once determined that the radio interference occurs, the following assumption is made that the reception waiting time period (namely, defined from step 8 to step 11) is equal to N times. In this reception waiting time period, no radio interference is determined from this determination state. The determination "no radio interference occurs" is advanced, whereas the determination "radio interference occurs" is delayed. Since the system is periodically initiated every time "t", once it is determined that no radio interference occurs, and then such a definition time of t×2×N times for "radio interference occurs" is required.

Such a hysteresis control may be readily changed by the remote control operating characteristic of the external control appliance 8. Alternatively, the defining time of the radio interference and the non-defining time of the radio interference may easily be set to be equal to each other, depending upon the way to set the link state determining counter (Link-Count).

At the step 17, the periodic task is ended, namely, the identification reception process operation is completed. With execution of such process steps, while the state of the wireless link and the determination of the radio interference are weighted by way of the link state determining counter, the self detection and the self diagnosis can be done on the side of the reception system. Then, the reception system can firmly produce the all key break code and can execute the all key break code operation by the own system.

Second Embodiment

Figure 3A:
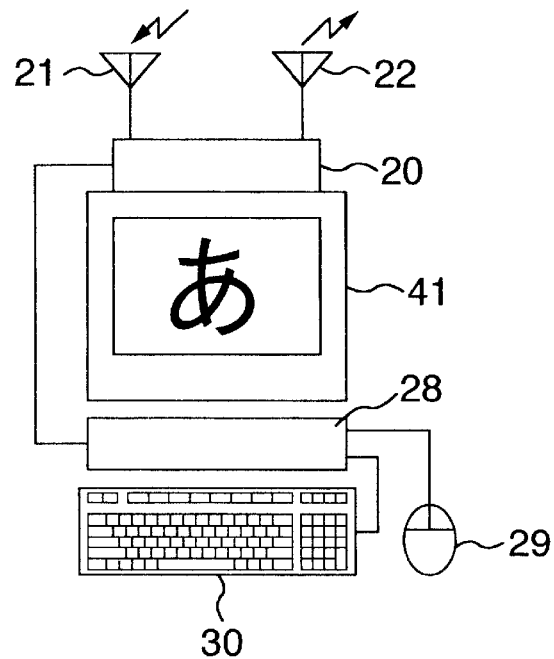
FIGS. 3A and 3B are explanatory diagrams for explaining an entire arrangement of a personal computer remote-control system.
Figure 3B:
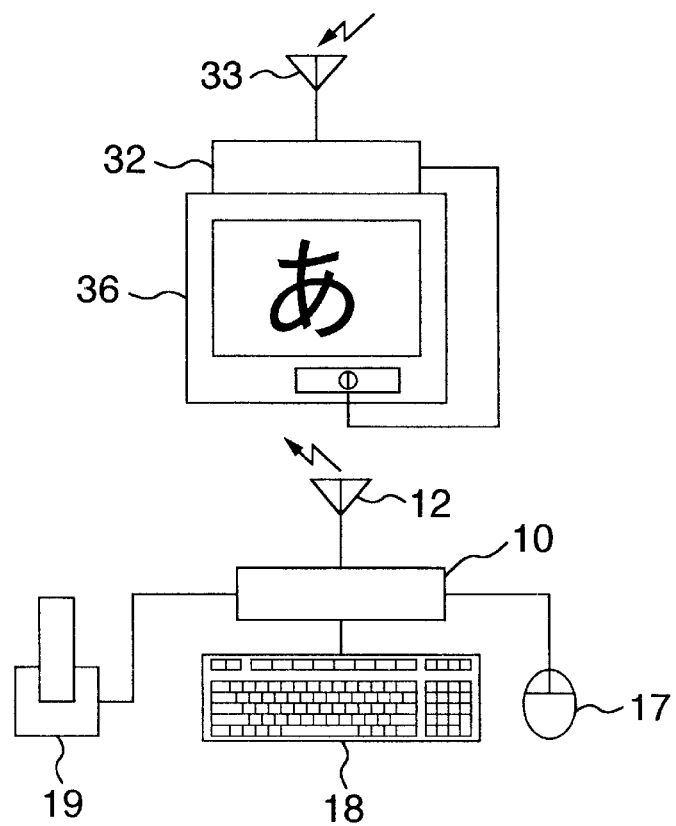

Next, a description will now be made of such an example that the present invention is applied to a personal computer remote control system in which a main body of a personal computer is operated by a keyboard at a remote position. FIGS. 3A and 3B are explanatory diagrams for explaining an entire arrangement of the personal computer remote control system. FIG. 3A shows a system in the main body of the personal computer, and FIG. 3B shows a system containing a keyboard and a home-use television set which are installed at a place apart from the main body of the personal computer. Reference numeral 28 denotes the main body of the personal computer; reference numeral 41 denotes a display unit attached to the personal computer; reference numeral 18 denotes the keyboard located at the place apart from the personal computer; and reference numeral 36 denotes the home-use television set located at the place apart from the personal computer.

Figure 4:
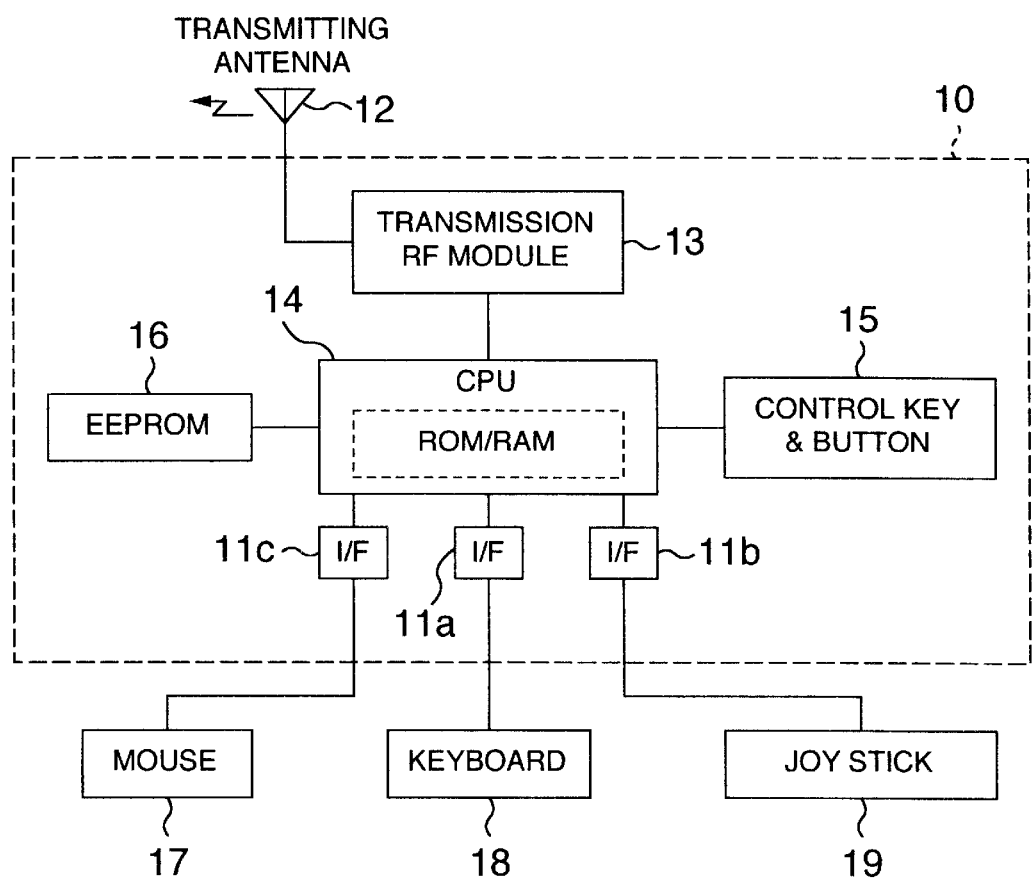
FIG. 4 is a block diagram of a control console unit -connected to a keyboard located apart from a main body of a personal computer in a personal computer remote-control system to which the present invention is applied.
Figure 5:
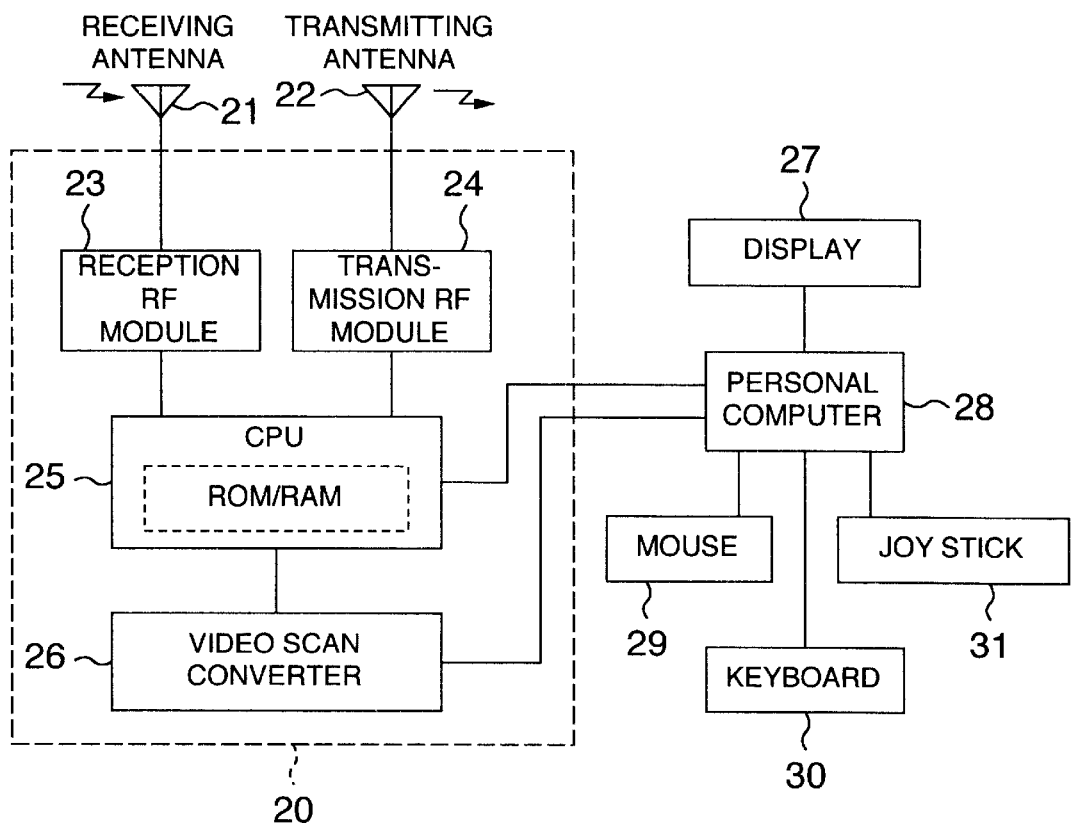
FIG. 5 is a block diagram for showing a transceiver unit installed on the side of the personal computer in the personal computer remote-control system.
Figure 6:
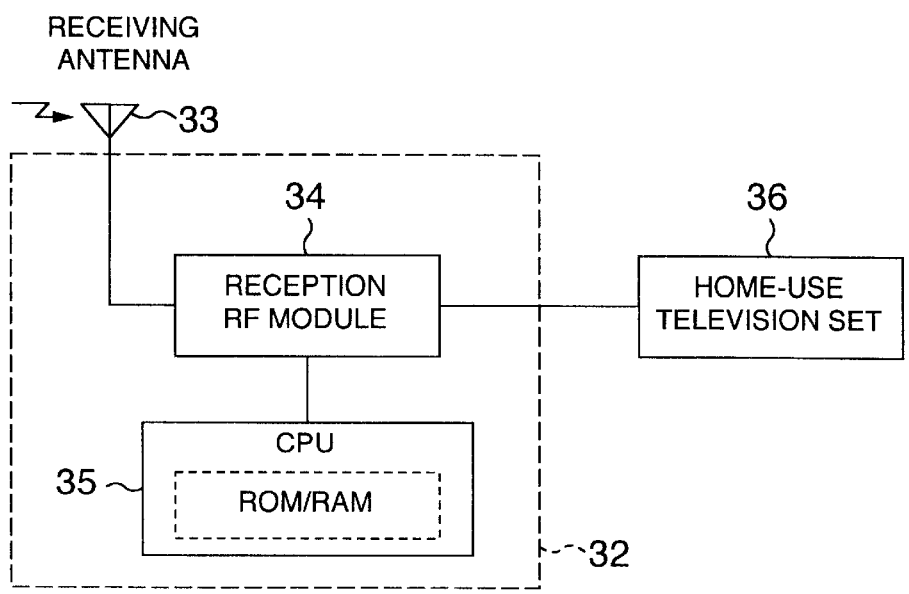
FIG. 6 is a block diagram for showing a receiver unit for transmitting an image signal to a home-use television set located apart from the main body of the personal computer in the personal computer remote-control system.

FIG. 4 is a schematic block diagram of a control console unit 10 connected to the keyboard located apart from the main body of the personal computer. FIG. 5 is a schematic block diagram of a transceiver unit 20 provided on the main body side of the personal computer in the personal computer remote-control system. FIG. 6 is a schematic block diagram of a receiver unit 32 for transmitting an image signal to the home-use television set located on the side of the keyboard for the remote control.

The respective functions will now be sequentially explained from FIG. 4 to FIG. 6. In FIG. 4, reference numeral 10 denotes the control console unit. A mouse 17, a keyboard 18 and a joy stick 19 are connected to the control console unit 10. Reference numeral 11a denotes an interface for connecting the keyboard 18, reference numeral 11b denotes an interface for connecting the joy stick 19, and reference numeral 11c denotes an interface for connecting the mouse 17.

Reference numeral 12 denotes a transmitting antenna for transmitting a wireless signal to the transceiver unit 20. Reference numeral 13 denotes a transmission RF module for outputting the wireless signal. Reference numeral 14 denotes a CPU for controlling the respective structural units. Reference numeral 15 denotes a button module equipped with a key for controlling a display screen. Reference numeral 16 denotes an EEPROM. As data to be written into the EEPROM 16, there is a set value "N" of the link state determining counter and a repetition period "t" of the identification code reception process task, for example. The set value "N" is used when the key information derived from the keyboard is detected. When the key information is adjusted by the user, the present data is updated by the latest data, and the updated data is written into the EEPROM 16.

In FIG. 5, reference numeral 20 denotes the transceiver unit. Reference numeral 21 denotes a receiving antenna for receiving the wireless signal transmitted from the above-described control console unit 10. Reference numeral 23 denotes a reception RF module for deriving data from the signal received by the receiving antenna 21. Reference numeral 22 denotes a transmitting antenna for transmitting to a receiver unit (will be discussed later) a wireless signal which is modulated with image data and speech data. Reference numeral 24 denotes a transmission RF module for outputting the wireless signal. Reference numeral 25 denotes a CPU for controlling the various structural units. Reference numeral 26 denotes a video scan converter which acquires a RGB signal of a personal computer output image, edits the acquired RGB signal, and then converts the RGB signal into an NTSC signal in order to display the personal computer output image on the home-use television set, the monitor unit and the like.

In FIG. 6, reference numeral 32 denotes the receiver unit for transmitting an image signal (picture signal) to the home-use television set. Reference numeral 33 denotes a receiving antenna for receiving the wireless signal which is modulated with image data and speech data and is transmitted from the transceiver unit 20. Reference numeral 34 denotes a reception RF module for receiving the wireless signal. Reference numeral 35 denotes a CPU for controlling the various structural units. The home-use television set 36 is connected to the receiver unit 32.

Next, operations of the personal computer remote control system will now be described. First, the personal computer 28 and the home-use television set 36 are initiated. Thereafter, in the personal computer 28, the personal computer remote control system with employment of the home-use television set is initiated. The transmission channel of the transmission RF module 13 is set so as to remote-control the personal computer 28 by using the control console unit 10 positioned at a place apart from the main body of the personal computer 28.

In the transceiver unit 20 set on the side of the main body of the personal computer, the CPU 25 sets the reception channel to the reception RF module 23 so as to receive the transmission data from the control console unit 10. Also, in the transceiver unit 20, the CPU 25 sets the transmission channel with respect to the transmit RF module 24 in order to transmit the image data and the speech data to the receiver unit 32.

In the receiver unit 32 set on the side of the home-use television set 36, the CPU 25 sets the reception channel with respect to the reception RF module 34 so as to receive the image data and the speech data both of which are transmitted from the transceiver unit 20. When the transmission/reception channel setting operations are accomplished in the respective RF modules, the output image f the personal computer 28 is displayed on the display screen of the home-use television set 36 as shown in FIG. 3A.

In the above-explained arrangement, the user manipulates the keyboard 18, the mouse 17 and the joy stick 19 to transmit the operation command and the key input data from the remote position to the personal computer 28 the key-depressing information and the key-releasing information produced by the user are acquired by the process operation of the CPU 15 in the control console unit 10. The acquired key information is processed to obtain the key transmission packet. The key transmission packet is converted into the wireless signal by the transmission RF module 13, and then the wireless signal is transmitted from the transmitting antenna 12. In connection with the transmission of the wireless signal, the identification code (ID code) is transmitted to the transmission RF module 13 every predetermined time, and then the identification code is converted into the wireless signal to be transmitted.

In the transceiver unit 20 set on the main body side of this personal computer, the key information is derived from the received key transmission packet, and then is transmitted to the personal computer 28. That is, the personal computer 28 operates in response to an instruction made by the user who manipulates the keyboard 18 at the position separated from the personal computer 28.

Also, in the transceiver unit 20, the CPU 25 judges whether or not the fixed-term identification code transmitted from the control console unit 10 is continuously received. When the fixed-term identification code is not continuously received, the CPU 25 transmits the all key break code to the personal computer 28.

Now, when the user changes the data such as the set value "N" of the link state determining counter or the repetition period "t" of the identification code reception process task, the changed data is written into the EEPROM 16 mounted on the control console unit 10. The operation is accomplished after the data is once changed. Thereafter, when this system is initiated, the changed data is read out from this EEPROM 16 to transmit this read data to the transceiver unit 20, and then the CPU 25 executes the data setting operation. As a result, the adjusting work need not be carried out every time the system is initiated.

As data to be written into the EEPROM 16, there is data for determining a sensitivity of the joy stick 19. When the joy stick 19 is connected to the control console unit 10 to remote-control the personal computer 28 of FIG. 5, the sensitivity of the joy stick 19 is required to be adjusted. In this case, the user adjusts the sensitivity of the joy stick 19 by using the control console unit 10. When the sensitivity control of the joy stick 19 is performed by the user, the present data is updated by the latest data, and then the sensitivity control data is written into the EEPROM 16 provided in the control console unit 10 to be saved therein.

When the system is initiated, the CPU 14 provided in the control console unit 10 reads out the sensitivity control data of the joy stick 19 saved in the EEPROM 16, and then modulate the wireless signal with the sensitivity control data to transmit the modulated wireless signal to the transceiver unit 20. The transceiver unit 20 transfers the received sensitivity control data to the personal computer 28. As explained above, since the sensitivity control data of the joy stick 19 saved in the EEPROM 16 is transmitted to the personal computer 28 by the form of the wireless signal, the joy stick 19 is initialized. Also, the sensitivity control operation of the joy stick 19 is not changed unless the joy stick 19 under use is replaced by another joy stick. Therefor, if the sensitivity control operation is carried out when the system is initiated, then such a sensitivity control operation executed every time the system is initiated can be omitted.

As apparent from the foregoing description, in the wireless transmission apparatus according to the present invention, there is such an advantage that the occurrence of the radio interference can be firmly confirmed, and the erroneous remote control of the external appliance connected to the wireless receiver, which is caused by the remaining key make state, can be surely avoided.

What is claimed is:

1. A wireless transmission apparatus for transmitting information input by key input means, and for remote-controlling an external appliance connected to a reception system, comprising:

a transmission system including said key input means, a wireless communication unit for transmitting an input key data code, and a transmitting antenna; and a reception system including a receiving antenna, a wireless communication unit, and reception key code analyzing means for analyzing a key make state and a key break state, wherein said transmission system regularly transmits an identification code to said reception system; and when said identification code is not detected regularly, said reception system automatically produces an all off code for informing said external appliance that all of keys are brought into a break state.

2. A wireless transmission apparatus to which key input means such as a keyboard functioning as an input apparatus is connected, for transmitting operation control information input by said input apparatus to a transmission system, for transmitting said operation control information from said transmission system, and for remote-controlling an external appliance such as a personal computer connected to a reception system, wherein said transmission system is comprises:
an interface for connecting said key input mean;
a control unit for producing a key transmission packet by entering information indicative of a make-state and break state of an input key to said key transmission packet, and for producing a fixed-term identification data packet containing a fixed-term code every predetermined time;
a wireless communication unit for modulating a wireless signal with said fixed-term data packet and said key transmission packet; and
a transmitting antenna, said reception unit comprises:
a receiving antenna;
a wireless communication unit; and
reception key code analyzing means for analyzing a make state and break state of a key, said transmission system regularly transmits an identification code to said reception system, and when said identification code is not detected regularly, said reception system automatically produces an all off code for informing said external appliance that all of keys are brought into the break state.

3. A transceiver unit for constituting a reception system of a wireless transmission apparatus, comprising:

a receiving antenna for receiving a wireless signal transmitted from a control console unit, and a reception RF module for deriving data from said received wireless signal;

a transmitting antenna and transmission RF module for transmitting to a receiver unit a wireless signal modulated with image data and speech data;

connection means for connecting with an external appliance;

a video scan converter for converting a personal computer output image signal into an image signal which can be displayed on a home-use television set and a monitor apparatus; and a CPU for executing a control operation for transmitting key information received by said receiving antenna and said reception RF module to said external appliance, and for automatically producing an all off code for informing said external appliance that all of keys are brought into the break state when identification code is not detected regularly.

4. A control system of a wireless transmission apparatus to which key input means such as a keyboard for controlling an external appliance is connected, and for transmitting remote operation control information produced by employing said input means to a transmission system to remote-control a personal computer and said external appliance which are connected to a reception system, wherein a single identification code is set for one pair of both said transmission system and said reception system;

when a link is established between said transmission system and said reception system, an identification code with which a transmitter and a receiver can identify in an one-to-one relationship each other is continuously transmitted from said transmission system to a reception unit every predetermined time, a key input apparatus being connected to said transmission system;

said reception system judges that a state of the link is stable when said reception system continuously recognizes said identification code, whereas said reception system judges that radio interference occurs when said reception system cannot recognize said identification code plural times under link state.

5. A control system of a wireless transmission apparatus as claimed in claim 4, wherein said transmission system remote-controls said external appliance by transmitting two codes to said reception system, said two codes being a code indicative of a key depressing state and another code for indicating such a state that said key is released from the key depressing state;

when a key make state of a key is determined on a reception side or when a key break state code to be subsequently received is not reached to said reception system due to the radio interference between said transmission system and said reception system, said reception system detects that said identification codes cannot be continuously received plural times, to judge occurrence of a radio interference; and said reception system produces an all break code for forcibly returning the key make state to the key break state, when said reception system judges the occurrence of the radio interference.

\* \* \* \* \*